United States Patent [19]

Ludwig

[11] 3,985,575

[45] Oct. 12, 1976

[54] SECONDARY BATTERY OR CELL WITH DUAL ELECTRODE

[75] Inventor: Frank A. Ludwig, Southfield, Mich.

[73] Assignee: Ford Motor Company, Dearborn, Mich.

[22] Filed: Jan. 30, 1976

[21] Appl. No.: 653,857

[52] U.S. Cl. .............................. 429/103; 429/161
[51] Int. Cl.² ........................................ H01M 43/00
[58] Field of Search ........... 136/6 FS, 6 F, 20, 83 T, 136/83 R, 86 A, 100 R, 153

[56] References Cited
UNITED STATES PATENTS 3,811,943  5/1974  Minck et al. ................. 136/6 FS Primary Examiner—Anthony Skapars
Attorney, Agent, or Firm—Roger L. May; Keith L. Zerschling

[57] ABSTRACT

An improved secondary battery or cell of the type having: (A) one or more anodic reaction zones containing a molten alkali metal reactant-anode in electrical contact with an external circuit; (B) one or more cathodic reaction zones containing (1) a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant; (C) a cation-permeable barrier to mass liquid transfer interposed between and in contact with said anodic and cathodic reaction zones; and (D) electrode means within said cathodic reaction zone for transporting electrons to the vicinity of said cation-permeable barrier during discharge of said battery or cell and for transporting electrons away from the vicinity of said cation-permeable barrier during charge of said battery or cell, said electrode means being in electrical contact with both said cation-permeable barrier and said external circuit and being immersed, at least in part, in said cathodic reactant. The improvement of the invention comprises an electrode means which comprises first and second electrodes, the first electrode being (i) adapted to be used in charging the battery or cell, (ii) disposed in a first region of the cathodic reaction zone, (iii) contiguous with or adjacent to a first section of the cation-permeable barrier and (iv) formed of a conductive material which is more readily wet by molten polysulfide than by molten sulfur, and the second electrode being (i) adapted to be used in discharging the battery or cell, (ii) disposed in a second region of the cathodic reaction zone, (iii) contiguous with or adjacent to a second portion of the cation-permeable barrier and (iv) formed of a material which is more readily wettable by molten sulfur than by molten polysulfide.

24 Claims, 9 Drawing Figures

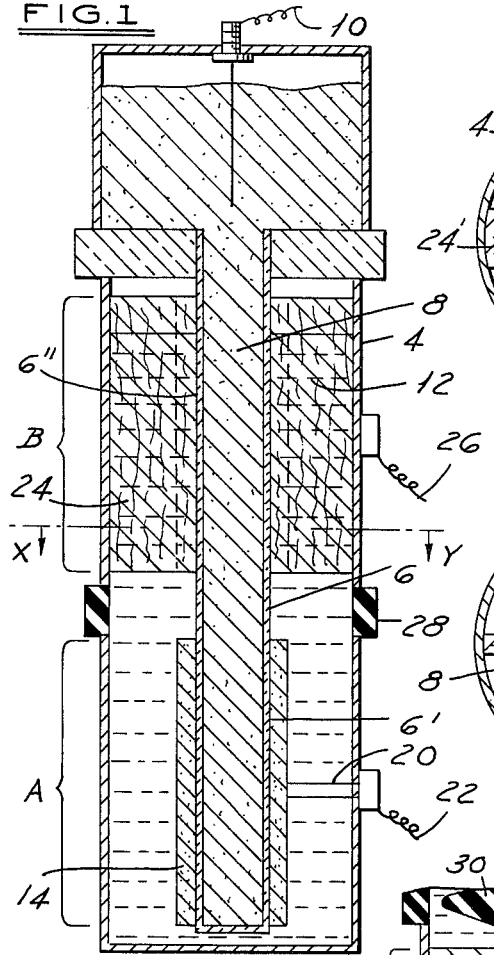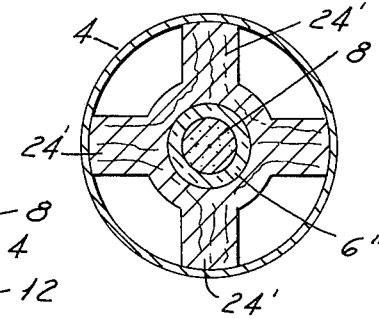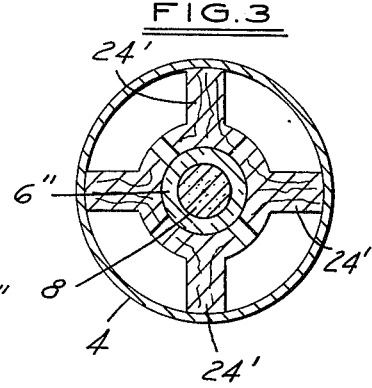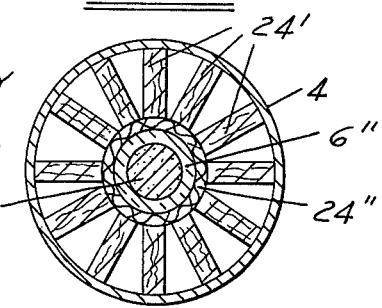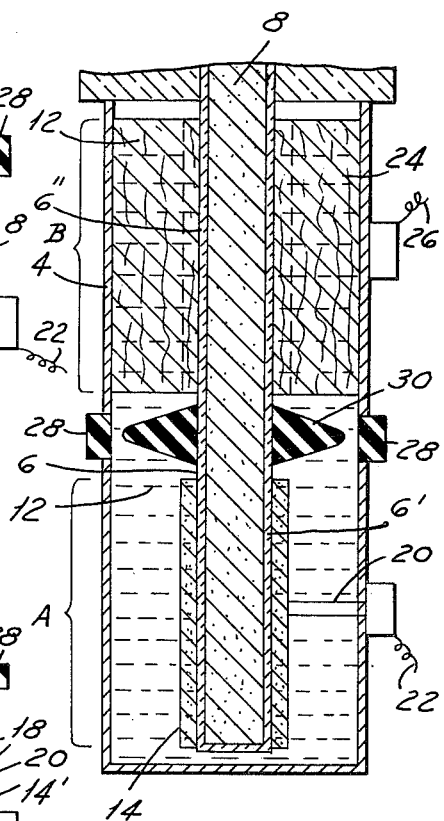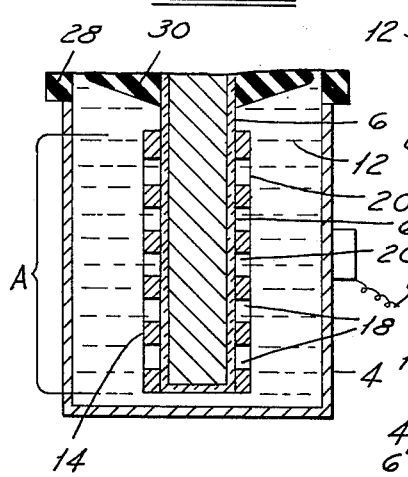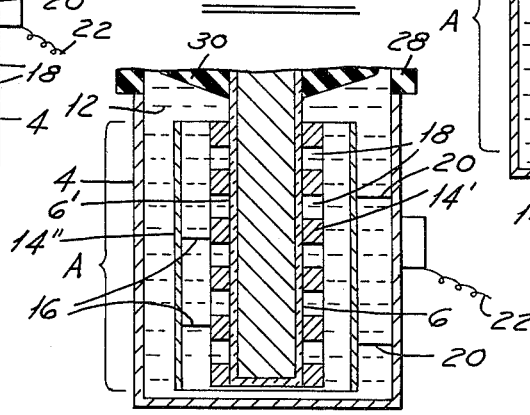

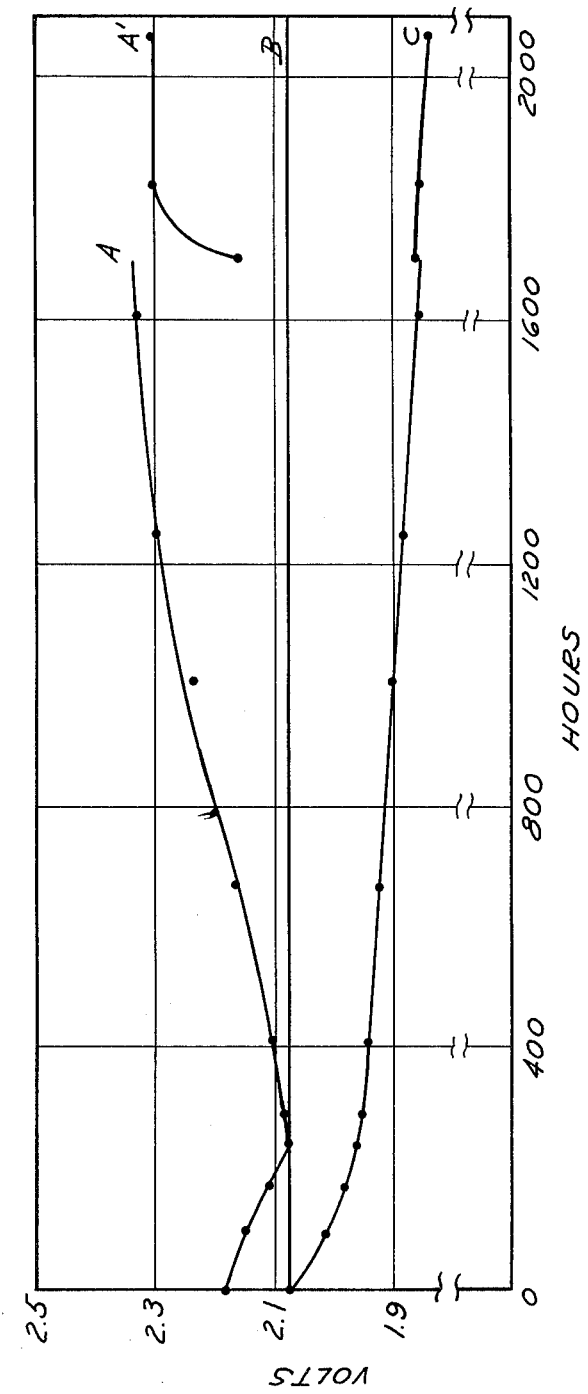

SECONDARY BATTERY OR CELL WITH DUAL ELECTRODE

The invention herein described was made in the course of or under a contract or subcontract thereunder with the National Science Foundation.

This application relates to an improved secondary cell or battery of the type comprising at least one molten alkali metal anode, at least one cathode, a liquid electrolyte electrochemically reversibly reactive with said alkali metal and in contact with said cathode, and a cation-permeable barrier to mass liquid transfer interposed between and in contact with said anode and said liquid electrolyte.

More particularly this application relates to an improved alkali metal/sulfur battery or cell which echibits increased energy efficiency on both charge and discharge and which as a result is especially useful for, but not limited to use in electric utility load leveling applications. Still more particularly, this application relates to an improved alkali metal/sulfur battery which includes one electrode optimized for charging and a second electrode optimized for discharging.

BACKGROUND OF THE INVENTION

A recently developed type of secondary or rehargeable electrical conversion device comprises: (1) an anodic reaction zone containing a molten alkali metal anode-reactant, e.g., sodium, in electrical contact with an external circuit; (2) a cathodic reaction zone containing (a) a cathodic reactant comprising sulfur or a mixture of sulfur and molten polysulfide, which is electrochemically reversibly reactive with said anodic reactant; (b) a solid elecrolyte comprising a cation-permeable barrier to mass liquid transfer interposed between and in contact with said anodic and cathodic reaction zones; and (c) electrode means within said cathodic reaction zone for transporting electrons to and from the vicinity of said cation-permeable barrier. As used herein the term "reactant" is intended to mean both reactants and reaction products.

During the discharge cycle of such a device, molten alkali metal atoms such as sodium surrender an electron to an external circuit and the resulting cation passes through the solid electrolyte barrier and into the liquid electrolyte to unite with polysulfide ions. The polysulfide ions are formed by charge transfer on the surfaces of the electrode by reaction of the cathodic reactant with electrons conducted through the electrode from the external circuit. Because the ionic conductivity of the liquid electrolyte is less than the electronic conductivity of the electrode material, it is desirable during discharge that both electrons and sulfur be applied to and distributed along the surface of the electrode in the vicinity of the cation-permeable solid electrolyte. When the sulfur and electrons are so supplied, polysulfide ions can be formed near the solid electrolyte and the alkali metal cations can pass out of the solid electrolyte into the liquid electrolyte and combine to form alkali metal polysulfide near the solid electrolyte.

During the charge cycle of such a device when a negative potential larger than the open circuit cell voltage is applied to the anode the opposite process occurs. Thus electrons are removed from the alkali metal polysulfide by charge transfer at the surface of the electrode and are conducted through the electrode material to the external circuit, and the alkali metal cation is conducted through the liquid electrolyte and solid electrolyte to the anode where it accepts an electron from the external circuit. Because of the aforementioned relative conductivities of the ionic and electronic phases, this charging process occurs preferentially in the vicinity of the solid electrolyte and leaves behind molten elemental sulfur. As can be readily appreciated the production of large amounts of sulfur near the surface of the cation-permeable membrane has a limiting effect on rechargeability. This is the case since sulfur is nonconductive and when it covers surfaces of the electrode, charge transfer is inhibited and the charging process is greatly hindered or terminated. Thus, in order to improve the rechargeability of a cell of this type it is necessary not only to supply polysulfide to the surface of the electrode in the vicinity of the cation-permeable membrane, but also to remove sulfur therefrom.

Numerous suggestions have been made for improving the mass transportation of cathodic reactants so as to improve charge and discharge efficiency as well as to increase the ampere hour capacity of the battery or cell.

U.S. Pat. No. 3,811,943 and U.S. Pat. application Ser. No. 545,048 filed Jan. 29, 1975 both disclose energy conversion device designs which allow or promote improved mass transportation of reactants and reaction products to and from the vicinity of the solid electrolyte and the porous electrode during both discharge and charge. In the device disclosed in the patent an ionically conductive solid electrolyte is located between a first reactant in one container and a second reactant in another container. An electrode for one of the reactants comprises a layer of porous electronically conductive material having one surface in contact with one side of the ionically conductive solid electrolyte and the other surface in contact with a structurally integral electronically conductive member permeable to mass flow of its reactant and electrically connected to the external circuit. An open volume exists between the structurally integral conductive member and the container wall to promote free flow and mixing of the reactant. Reactants also flow readily through the conductive member into the layer of porous electronically conductive material. The conductive member distributes electrons to the porous, conductive material which in turn transfers electrons to or from the reactants.

The improvement disclosed in the patent application comprises designing the cathodic reaction zone of the device such that there are a plurality of channels and/or spaces within said zone which are free of porous conductive electrodes and which are thus adapted to allow free flow of the molten cathodic reactants during operation of the device. This flow results from free convection within the channels and/or spaces, and from wicking of cathodic reactants within the conductive porous material.

The prior art designs disclosed and claimed in the aforementioned U.S. patent and in Ser. No. 545,048 are effective in promoting distribution of reactants during both discharge and charge. However, even with these improved designs it is difficult to recharge the cells or batteries at high rates.

U.S. Pat. application Ser. No. 567,464 filed Apr. 14, 1975 and Ser. Nos. 605,941 and 605,942 now U.S. Pat. No. 3,951,689 all teach ways of improving the ampere-hour capacity as well as charge and discharge efficiency of such batteries or cells. However, each relies on vapor transport of sulfur to accomplish its purpose. This either complicates cell design or requires additional external heating or cooling.

U.S. Pat. application Ser. No. 653,865 filed concurrently herewith and entitled "Secondary Battery or Cell with Polysulfide Wettable Electrode" discloses an improved cell with increased charge efficiency resulting from the use of a polysulfide wettable electrode. Such cells, while showing significant increases in charge efficiency, do demonstrate appreciable electrode polarization on discharge and, thus decreased discharge efficiency.

It has been found that a battery or cell showing both increased efficiency on charge and increased efficiency on discharge can be achieved by combining the improvement of the above-mentioned concurrently filed application with still further improvements of this invention.

BRIEF DESCRIPTION OF THE INVENTION

The improvement of this invention comprises an electrode means which comprises first and second electrodes, the first being (i) adapted to be in use during charge of said battery or cell, (ii) disposed in a first region of the cathodic reaction zone, (iii) contiguous with or adjacent to a first section of the cation-permeable barrier and (iv) wettable by molten polysulfide to a greater extent than by molten sulfur, and the second electrode being (i) adapted to be in use during discharge of said battery or cell, (ii) disposed in a second region of the cathodic reaction zone, (iii) contiguous with or adjacent to a second section of the cation-permeable barrier and (iv) wettable by molten sulfur to a greater extent than by molten polysulfide.

The invention will be more fully understood after reading the following detailed description thereof in conjunction with the drawings in which:

FIG. 1 is a vertical sectional view of a cell design suitable for use with the improvement of this invention;

FIGS. 2, 3 and 4 are examples of suitable cross-sections of the cell of FIG. 1 taken along x–y of FIG. 1, and FIGS. 5, 6, 7 and 8 are cut away lower vertical sections of a cell which is further modified in certain respects in accordance with the improvement of the invention;

FIG. 9 is a graph showing electrode polarization vs. time for a device incorporating the improvements of the invention.

DETAILED DESCRIPTION OF THE INVENTION

The type of secondary or rechargeable electrical conversion devices to which the improvement of this invention applies and various components thereof are disclosed in the following U.S. Pat. Nos., the disclosures of which are incorporated herein by reference: 3,404,035; 3,404,036; 3,413,150; 3,446,677; 3,458,356; 3,468,709; 3,468,719; 3,475,220; 3,475,223; 3,475,225; 3,535,163; 3,719,531 and 3,811,943.

As mentioned above, the secondary batteries or cells to which the improvement of this invention applies comprise generally; (1) an anodic reaction zone containing a molten alkali metal reactant-anode in electrical contact with an external circuit; (2) a cathodic reaction zone containing a cathodic reactant comprising a liquid electrolyte selected from sulfur or a mixture of sulfur and sulfur saturated polysulfide of said molten alkali metal reactant which is electrochemically reversibly reactive with said anodic reactant; (3) a cation-permeable barrier to mass liquid transfer interposed between and in contact with said anodic and cathodic reaction zones; and (4) an electrode means within said cathodic reaction zone for transporting electrons to and from the vicinity of said cation-permeable barrier during discharge and charge of said battery or cell respectively, the electrode means being in electrical contact with both the cation-permeable barrier and the external circuit and being immersed, at least in part, in the cathodic reactant.

The anodic reactant employed in such devices is an alkali metal which is maintained above its melting point when the device is in operation. The anodic reactant is heated by any conventional means including, not by way of limitation, Joule heating, induction heating, and heat exchange with a suitable fluid. The anodic reactant may also be viewed as the anode proper or conductor through which the electron flow to the external circuit is achieved. A cell component of this type is conventionally referred to in the art as a sacrificial electrode in that while it is serving the role of a conductor, it is also undergoing electrochemical reaction. Molten sodium is employed as the anodic reactant in most preferred embodiments of such devices. However, potassium, lithium, other alkali metals, mixtures of such alkali metals, or alloys containing such alkali metals can be used.

The cathodic reactant of the fully charged battery or cell is molten sulfur, which is electrochemically reversibly reactive with the anodic reactant. As the device begins to discharge, the mole fraction of elemental sulfur drops while the open circuit voltage remains constant. During this portion of the discharge cycle as the mole fraction of sulfur drops from 1.0 to approximately 0.72 the cathodic reactant displays two phases, one being essentially pure sulfur and the other being sulfur saturated alkali metal polysulfide in which the molar ratio of sulfur to alkali metal is about 5.2:2. When the device is discharged to the point where the mole fraction of sulfur is about 0.72 the cathodic reactant becomes one phase in nature since all elemental sulfur has formed polysulfide salts. As the device is discharged further, the cathodic reactant remains one phase in nature and as the mole fraction of sulfur drops so does the open circuit voltage corresponding to the change in the potential determining reaction. Thus, the device continues to discharge from a point where polysulfide salts contain sulfur and alkali metal in a molar ratio of approximately 5.2:2 to the point where polysulfide salts contain sulfur and alkali metal in a ratio of about 3:2. At this point the device is fully discharged.

Since in the fully discharged state the polysulfide melt is single phase in nature, the activity of sulfur in the melt is substantially less than unity when the mole fraction of sulfur is about 0.60 and approaches unity as the mole fraction approaches 0.72, the point at which the polysulfide is sulfur saturated. As the cell is recharged, elemental sulfur is formed monentarily on the surfaces of the electrode in the vicinity of the solid ceramic electrolyte. Since sulfur is nonconductive, the presence of elemental sulfur on the electrode could cause difficulty in continuing the recharging process. However, when the mole fraction of sulfur in the melt is between about 0.60 and about 0.72, i.e., the single phase region, the sulfur which forms on the surface of the electrode tends to react immediately with the polysulfide melt in the vicinity thereof to form a second polysulfide in which the molar ratio of sulfur to alkali metal is greater than 3:2. This process occurs until the molar ratio of sulfur to alkali metal is approximately 5.2:2. This is the point where the mole fraction of sulfur is approximately 0.72 and the open circuit voltage becomes constant.

As charging of the cell or battery continues, the sulfur saturated polysulfide will no longer react with elemental sulfur deposited on the electrode to form polysulfide having a greater mole ratio of sulfur to alkali metal. Thus, as the charging cycle continues the cathodic reactant becomes two phase in nature. One phase is elemental sulfur and the other is sulfur saturated alkali metal polysulfide in which the molar ratio of sulfur to alkali metal is about 5.2:2, with the mole fraction of sulfur in the cathodic reaction zone continually increasing as the recharging cycle progresses. It is in this region of the recharging cycle that substantial difficulties are confronted because of the formation of large amounts of nonconductive elemental sulfur on electrode surfaces. In fact, it is extremely difficult to recharge such secondary cells or batteries to any great extent past the point at which the polysulfide becomes saturated with sulfur and thus the deposition of elemental sulfur has a limiting effect on rechargeability.

The anodic reactant is separated from the cathodic reactant by a solid barrier to mass liquid transfer that is selectively ionically conductive with respect to cations of the anodic reactant and substantially impermeable to other ions which may be stored in the cathodic reactant. Thus, the reaction zone separator or solid electrolyte is a material which will permit the transfer of the ions of the anodic reactant through the separator and into the cathodic reactant during operation of the device. The cathodic reactant together with the separator provides a sufficient barrier to free electron flow in the internal portion of the electrical circuit to permit a difference of potential to develop at the respective electrodes of the devices in operation. It is preferred that the separator be as thin as possible without unduly sacrificing strength. Although optimum thickness may vary with intended use, separators having a thickness in the range of about 20 to about 2,000, preferably about 100 to about 1,000, microns have been found to be effective.

Both glasses and polycrystalline ceramic materials have been found suitable for use in such devices as the solid electrolyte or reaction zone separators. Among the glasses which may be used with such devices and which demonstrate an unusually high resistance to attack by molten alkali metal are those having the following composition: (1) between about 47 and about 58 mole percent sodium oxide, about 0 to about 15, preferably about 3 to about 12, mole percent of aluminum oxide and about 34 to about 50 mole percent of silicon dioxide; and (2) about 35 to about 65, preferably about 47 to about 58, mole percent sodium oxide, about 0 to about 30, preferably about 20 to about 30, mole percent of aluminum oxide, and about 20 to about 50, preferably about 20 to about 30, mole percent boron oxide. These glasses may be prepared by conventional glass making procedures using the listed ingredients and firing at temperatures of about 2700°F.

The polycrystalline ceramic materials useful as reaction zone separators or solid electrolytes are bi- or multi-metal oxides. Among the polycrystalline bi-or multi-metal oxides most useful in the devices to which the process of this invention applies are those in the family of Beta-alumina all of which exhibit a generic crystalline structure which is readily identifiable by X-ray diffraction. Thus, Beta-type alumina or sodium Beta-type-alumina is a material which may be thought of as a series of layers of aluminum oxide held apart by columns of linear Al-O bond chains with sodium ions occupying sites between the aformentioned layers and columns. Among the numerous polycrystalline Beta-type-alumina materials useful as reaction zone separators or solid electrolytes are the following:

1. Standard Beta-type-alumina which exhibits the above-discussed crystalline structure comprising a series of layers of aluminum oxide held apart by layers of linear Al-O bond chains with sodium occupying sites between the aforementioned layers and columns. Beta-type-alumina is formed from compositions comprising at least about 80% by weight, preferably at least about 85% by weight, of aluminum oxide and between about 5 and about 15 weight percent, preferably between about 8 and about 11 weight percent, of sodium oxide. There are two well known crystalline forms of Beta-type-alumina, both of which demonstrate the generic Beta-type-alumina crystalline structure discussed hereinbefore and both of which can easily be identified by their own characteristic X-ray diffraction pattern. Beta-alumina is one cyrstalline form which may be represented by the formula $Na_2O.11Al_2O_3$. The second crystalline is B''-alumina which may be represented by the formula $Na_2O.6Al_2O_3$. It will be noted that the B'' crystalline form of Beta-type-alumina contains approximately twice as much soda (sodium oxide) per unit weight of material as does the Beta-alumina. It is the B''-alumina crystalline structure which is preferred for the formation of solid electrolyte or reaction zone separators for the device to which the process of this invention is applicable. In fact, if the less desirable beta form is present in appreciable quantities in the final ceramic, certain electrical properties of the body will be impaired.

2. Boron oxide $B_2O_3$ modified Beta-type-alumina wherein about 0.1 to about 1 weight percent of boron oxide is added to the composition.

3. Substituted Beta-type-alumina wherein the sodium ions of the composition are replaced in part or in whole with other positive ions which are preferably metal ions.

4. Beta-type-alumina which is modified by the addition of a minor proportion by weight of metal ions having a valence not greater than 2 such that the modified Beta-type-alumina composition comprises a major proportion by weight of ions of aluminum and oxygen and a minor proportion by weight of a metal ion in crystal lattice combination with cations which migrate in relation to the crystal lattice as a result of an electric field, the preferred embodiment for use in such electrical conversion devices being wherein the metal ion having a valence not greater than 2 is either lithium or magnesium or a combination of lithium and magnesium. These metals may be included in the composition in the form of lighium oxide or magnesium oxide or mixtures thereof in amounts ranging from 0.1 to about 5 weight percent.

The cathodic electrode is in electrical contact with the cation-permeable barrier and an external circuit. The conductive material may comprise any material which is electronically conductive and which is resistant to attack by reactants within the cathodic reaction zone.

While the secondary cells or batteries to which the improvement of this invention is applicable may have a number of different configurations, several of which are disclosed in the above-incorporated patents, a preferred configuration comprises: (1) a container, preferably tubular; (2) a cation-permeable barrier to mass liquid transfer, preferably tubular, which is disposed within said container so as to create an anodic reaction zone within said barrier and a cathodic reaction zone between said barrier and said container; (3) a molten alkali metal anodic reactant within said anodic reaction zone in electrical contact with an external electrical circuit; (4) a cathodic reactant comprising a liquid electrolyte which is electrochemically reversibly reactive with said anodic reactant and which, in at least the partially discharged state is selected from the group consisting of (a) a single phase composition comprising molten polysulfide salts of said anodic reactant and (b) a two phase composition comprising molten sulfur and molten sulfur saturated polysulfide salts of said anodic reactant; and (5) an electrode means which is disposed within said cathodic reaction zone, filled at least in part with said cathodic reactant and is in electrical contact with both said barrier and said external circuit. Such secondary cells which are preferably tubular or cylindrical, thus comprise cathodic reaction zones which completely surround the solid electrolyte or reaction zone separator.

IMPROVEMENT OF THE INVENTION

The improved batteries or cells in accordance with this invention demonstrate increased efficiency during both charge and discharge. The improvement of the invention comprises an electrode means which comprises first and second electrodes, the first electrode being (i) adapted to be in use during charge of the battery or cell, (ii) disposed in a first region of the cathodic reaction zone, (iii) contiguous with or adjacent to first section of the cation-permeable barrier, and (iv) formed of a conductive material which is more readily wettable by polysulfide salts than by sulfur and the second electrode being (i) adapted to be in use during discharge of the battery or cell, (ii) disposed in a second region of the cathodic reaction zone, (iii) contiguous with or adjacent to a second section of the cation-permeable barrier and (iv) formed of a conductive material which is more readily wet by molten sulfur than by molten polysulfide salts during operation of the battery or cell.

The measure of wettability of a substrate by a liquid material is the contact angle formed between the liquid and the substrate. If the liquid wets the substrate completely the contact angle will be 0°. If the liquid beads up completely on the substrate, the contact angle will be 180°. Thus, the lower the contact angle between the liquid and the substrate the greater the wet ability of the substrate by the liquid. For example, in helium at 318°C the contact angle formed by molten $Na_2S_4$ on graphite is approximately 100° while the contact angle formed by molten sulfur on graphite is approximately 25°. Thus, graphite is preferentially wet by sulfur as opposed to polysulfide salts. As such, a graphite material such as a graphite felt is ideal for use as the second or discharge electrode and unsuitable unless modified to make it preferentially wettable by polysulfide, as the first or charge electrode in the improvement of this invention.

It has been found that by employing conductive materials which are preferentially wettable by polysulfide salts and by sulfur as the first or charge and second or discharge electrodes respectively it is possible to substantially reduce or eliminate electrode polarization while either charging or discharging. As a result, the batteries or cells made in accordance with the improvement of this invention demonstrates good electrical efficiency or both charge and discharge and, as such, are ideal for a number of uses such as for electric utility load levelling.

The first or charging electrode of the battery or cell of this invention is identical with the electrode used in the battery or cell described in the aforementioned concurrently filed application. That electrode may be disposed in a variety of patterns and preferably is selected from the group consisting of: (A) porous conductive material which is disposed in the manner taught by Ser. No. 545,048 within the first region of the cathodic reaction zone such that the region contains a plurality of channels or spaces which are free of the porous conductive material and which, in combination with that porous conductive material, are adapted to allow flow within said first region of the cathodic reactants during operation of the battery or cell, (B) porous conductive material which is confined to an area of said first region of the cathodic reaction zone adjacent to the aforementioned first section of the cation-permeable barrier; and (C) two major portions, the first being porous conductive material which is confined to an area of the first region of the cathodic reactant zone which is adjacent to and continuous with the first section of the cation-permeable barrier, and the second being a conductive material which is electrically connected to said first portion, but which is spaced from the first portion within said first region so as to create a channel therebetween. An advantage which is achieved by positioning an electrode adjacent to or contiguous with the cation-permeable barrier is that wetting by polysulfide is enhanced by the capillarily between the electrode material and the barrier.

The term "porous conductive material" as used in this application is intended to mean any of the compositions within the purview of the invention which is in the form of: a perforated material; an expanded material; a felt; a woven or nonwoven fabric; a sintered material; a foam; a flame sprayed material; and other forms which will be apparent to the skilled artisan.

Among the numerous materials which are preferentially wettable by polysulfide salts, and which are therefore preferred materials for use as the first electrode discussed above are: (1) metals, which as used herein shall include alloys as well as such metals or alloys having an oxidized surface(s). A preferred metal for use in the invention is stainless steel. It has been found, for example, that no electrode polarization occurs at a stainless steel AISI No. 446 electrode at 330°C while charging in the two phase region. The contact angle in helium at 318°C formed by $Na_2S_4$ on AISI No. 446 stainless steel is 0°–5°, while the contact angle formed by sulfur on stainless steel is approximately 25°. These contact angles remain the same independent of the thickness of the oxide layer on the stainless steel (i.e., the virgin stainless steel can be abraded so as to remove old oxide, can be oxidized in hot nitric acid, etched in HCl, oxidized in air at 800°C, or used untreated). Thus, in all cases the stainless steel is preferentially wetted by sodium polysulfide. All metals which have been exposed to air are covered to a greater or lesser extent, depending on the particular metal, with an oxide coating. Since oxides are particularly stable to molten sulfur and molten alkali metal polysulfides, such as sodium polysulfide, it becomes advantageous to further oxidize the metal surfaces, either by oxidation at elevated temperatures or by attack by oxidizing acids. It is understood that metals and alloys, as used herein, can be either coated with oxide due to normal exposure to an ambient atmosphere or may be specially treated to thicken their oxide coatings, (2) Materials having a surface consisting of and including materials formed completely of a composition of a polar or ionic character or with unfilled d-orbitals. Such compositions include oxides or sulfides of metal selected from the group consisting of a) metals of Group I, II and III of the Periodic Table of Elements, b) Transition Series Metals, and c) tin, lead, antimony and bismuth. Preferentially, the metal salts or oxides are highly insoluble in the sulfur and polysulfide phases. Preferred materials are: aluminum oxide ($Al_2O_3$); molybdenum disulfide ($MoS_2$); chromium trioxide ($Cr_2O_3$); lanthanum chromite ($LaCrO_3$); calcium doped lanthanum chromite ($La_{1-x}Ca_xCrO_3$); antimony pentoxide doped tin oxide ($Sb_2O_5 - SnO_2$); lithium doped nickel oxide ($Li_x$-$Ni_{1-x}O$); titanium doped iron oxide ($Ti_xFe_{2-x}O_3$); and tantalum doped titanium oxide ($Ta_2O_5$-$TiO_2$). Most of these materials are electronic conductors and can therefore serve as the electrode or can completely coat the electrode. Others of these materials such as aluminum oxide or chromium trioxide, are insulators and must therefore only partially cover the electrode surface.

3. Surface oxidized graphite. Graphite oxide can be prepared by the standard methods (e.g., graphite in a 1:2 v/v mixture of concentrated nitric and sulfur acids with solid potassium chlorate added or graphite in sulfuric acid containing sodium nitrate and potassium permanganate). Treatment of the graphite must be brief so that only the surface is oxidized. When this material is used as an electrode in an alkali metal/sulfur cell and heated in the presence of the cathodic reactant to operating temperatures, the graphitic oxide surface converts to graphite sulfide which is preferentially wet by the polysulfide.

4. Electrically conducting intercalated graphite Graphite bromide is formed by exposure of graphite felt electrodes to either liquid bromine or bromine vapor. Considerable bromine is retained in the graphite at the operating temperature of the cell. The graphite bromide surface is more wettable by polysulfides than the untreated graphite.

Many materials can be reversibly intercalated in graphite. These materials all tend to make graphite more wettable by polysulfides. The intercalated graphite is prepared by heating the materials with the graphite.

5. Graphite which bears a continuous or discontinuous coating of one or more of the materials of (1), (2), (3), or (4); and 6. A combination or mixture of the material of (1), (2), (3), (4) or (5).

Several particularly preferred designs for the first or charging electrode are:

1. A design wherein the first electrode comprises a layer of felt or a perforated or expanded metal, such as stainless steel, which is confined to an area adjacent the aforementioned first section of the cation-permeable barrier. More specifically, the electrode material in such a design may be wrapped around the cation-permeable barrier.

2. A design wherein the first electrode comprises a first portion, such as a layer of felt or a perforated expanded metal, which is confined to an area adjacent the first section of the cation-permeable barrier and which is contiguous with said cation-permeable barrier and a second portion formed of conducting material such as metal which is spaced from the first portion so as to form a channel therebetween, but which is electrically connected thereto. The second portion may or may not be porous or perforated. In the preferred tubular type of battery or cell the second portion may be a cylinder which is concentrically disposed about and spaced from the cation-permeable barrier.

The second or discharging electrode preferably comprises porous conductive material which is disposed within a second region of the cathodic reaction zone such that the region contains a plurality of channels or spaces which are free of said porous conductive material and which in combination with said porous conductive material, are adapted to allow flow within said region of said cathodic reactant during operation of said battery or cell. Such a disposition of an electrode within a cathodic reaction zone is taught by Ser. No. 545,048.

Preferably, the second region of the cathodic reaction zone is positioned above the first region of the cathodic reaction zone. This arrangement promotes the natural free convection of cathodic reactant since the sulfur formed at the first or charging electrode and which is required at the second or discharging electrode tends to rise, whereas the polysulfide formed at the second or discharging electrode and required at the first or charging electrode tends to fall. The free convection between the first and second electrodes depends upon the difference in density of sulfur and the alkali metal polysulfides. Therefore, the device operates very effectively in the two phase region of charge or discharge. This region accounts for sixty percent (60%) of the capacity and has a flat (constant) voltage characteristic. Thus, for some applications where fully capacity is not required, such as in electric utility load levelling, but where high charge discharge energy efficiency is desired the operation of this device may be preferably limited to the two phase region. The various polysulfide salts of the one phase region all have approximately the same density. Therefore, free convection is not as effective a means of mass transport of reactants and products in the one phase region. However, the device also operates in the one phase region but a somewhat decreased charge/discharge efficiency and ampere-hour capacity.

In a particularly preferred embodiment, the porous conductive material in the second region of said cathodic reaction zone is disposed so as to create a plurality of vertical channels or spaces which (i) are free of said porous conductive material, (ii) extend from the bottom of the second region upward and at least partially through said second region and (iii) are adapted to promote the flow of cathodic reactant within the second region as well as to and from the first region during operation of the battery or cell. Obviously such vertical channels or spaces assist in the flow of sulfur to and polysulfide away from said second region.

The various materials which will exhibit the required preferential wettability by sulfur and which, therefore, are suitable as the second or discharge electrode will be apparent to those skilled in the art. However, some preferred materials include graphite felt or foam, porous graphite, vitrous carbon foam, pyrolytic graphite felt or foam, regidized graphite felt or foam, or materials which have been covered or coated with the above carbon materials.

If the first or charge electrode of the improved device of the invention is formed of a material, such as stainless steel, which tends to corrode somewhat on discharge when the sodium/sulfur ratio in the polysulfide is in a certain range even though it is not in use, it may then be desirable to maintain a continuous low charging current or trickle charge flowing through said first electrode even during discharge of said battery or cell. There is no particular limitation on the trickle charge current density, but a convenient current would be one percent (1%) or less of the discharging current. This trickle charge is not lost, of course. It is useful charging energy to be gained back on discharge of the second region. In order to avoid current leakage when applying such a charge current to the first electrode while discharging the battery or cell, it may be desirable to provide a baffle between the first and second regions so as to lengthen the melt path to the point where leakage current between the second or discharging electrode and the lower trickle charging electrode is negligible. Due to the appreciable melt resistance this should be readily accomplished.

If the baffle is not desired during application of the trickle charge, however, the two regions of the cathodic reaction zone can be isolated electrically by having a separate anodic reaction zone for each region. In such a design the first and second sections of the cation-permeable barrier are interposed and in contact with respectively (i) a first anodic reaction zone and said first region of the cathodic reaction zone, and (ii) a second anodic reaction zone and said second region of the cathodic reaction zone so as to electrically isolate the first and second regions. The first and second anodic reaction zones must then also be adapted so as to allow the alkali metal-anodic reactant to be transported from the first anodic reaction zone to the second anodic reaction zone.

All of the aforementioned preferred designs and others will be better understood from the following detailed description of the drawings.

DETAILED DESCRIPTION OF THE DRAWINGS

FIG. 1 shows a full vertical cross-section of the preferred tubular-type cell embodying the improvement of this invention.

FIG. 5 shows a cell similar to FIG. 1, but with a further modification in accordance with the invention.

FIGS. 6, 7 and 8 are merely broken away vertical sections of the lower portion of the cell which show several examples of suitable designs for the porous conductive material.

FIGS. 2, 3 and 4 are cross-sections taken along line x–y of FIG. 1 and show several examples of designs which may be useful for the second or discharging electrode.

To the extent that the part or material described is shown in each of the figures it will be designated by the same numeral used to describe FIG. 1.

The cell shown in FIG. 1 comprises: A tubular container 4 which is in electrical contact with an external circuit via electrodes to be discussed hereinafter; a tubular cation-permeable barrier to mass liquid transfer 6 which is disposed within said tubular container 4 so as to create an anodic reaction zone within the tubular barrier containing a molten-alkali metal reactant-anode 8 which is in electrical contact via lead 10 to an external circuit; a cathodic reaction zone between tubular barrier 6 and tubular container 4; a molten cathodic reactant 12 and an electrode means which is disposed within the cathodic reaction zone. The electrode means comprises a first electrode 14 and a second electrode 24 with first electrode 14 being (i) adapted to be in use during charge of the battery or cell, (ii) disposed in a first region of the cathodic reaction zone (iii) contiguous or adjacent to a first section 6 of cation-permeable barrier 6 and (iv) formed of a conductive material which is preferentially wet by molten polysulfide. The first electrode 14 of FIG. 1 is shown as a porous material such as a felt which is confined to an area adjacent to and is contiguous with first section 6' of said cation-permeable barrier 6. Other first electrode shapes among the many which may be employed in the improvement of this invention are shown in FIGS. 6, 7 and 8. FIG. 6 shows an embodiment which is representative of those wherein the electrode 14 comprises porous conductive material which is disposed within said first region A in the manner taught by Ser. No. 545,048 so as to create a plurality of channels or spaces which in combination with the porous conductive material allow flow within region A of cathodic reactant during operation of the battery or cell. FIG. 7 shows another embodiment in which first electrode 14, like that of FIG. 1 is confined to an area adjacent to or contiguous with said first section 6' of cation-permeable barrier 6. However, the porous conductive material of the design of FIG. 7 is a metal sheet which has perforations 18 therein and which is wrapped around first section 6' of cation-permeable barrier 6. FIG. 8 shows a third preference design for first electrode 14. In this design a first portion or porous conductive material 14' comprising a metal sheet with perforations 18 is wrapped around first section 6' of cation-permeable barrier 6. A second electrode portion 14'' which (i) comprises a metal cylinder, (ii) is electrically connected to portion 14' via wires 16 and (iii) may or may not be porous or perforated and is disposed concentrically about said first portion 14' of first electrode 14 so as to create a channel therebetween. This channel helps create a chimney effect in Region A so as to increase connective flow of cathodic reactants. First electrode 14 is shown in electrical contact with container 4 which serves as a current collector. In those cases where electrode 14 does not make direct electrical contact with container 4 it is connected by wires 20. Container 4 is connected with the external circuit by electrode 22.

Second electrode 24 is (i) adapted to be in use during discharge of the battery or cell, (ii) disposed in a second region B of the cathodic reaction zone, (iii) contiguous with or adjacent to a second section 6'' of cation-permeable barrier 6 and (iv) formed of a conductive material which is preferentially wet by molten sulfur. The second electrode 24 of FIG. 1 is representative of electrodes useful in the improvement of the invention and is shown as a porous conductive material or felt which is disposed in said second region B so that said region B contains a plurality of channels or spaces which, in combination with the porous conductive material, promote flow of cathodic reactant within said region B. FIGS. 2, 3 and 4 show some preferred cross sections for electrode 24. Each of these designs comprises a plurality of electrode sections 24' formed of porous conductive material and being disposed such that vertical channels are created in region B of the cathodic reaction zone. FIG. 4, in addition to sections 24' includes a section 24'' which comprises a porous conductive woven fabric which is contiguous with and wrapped around said second section 6'' of said cation-permeable barrier 6. Second electrode 24 of course, is connected electrically to a current collector, shown in the Figures as container 4 which, in turn, is connected to the external circuit by electrode lead 26.

As shown clearly in FIG. 1, the walls of container 4 which enclose and serve as current collector for regions A and B of the cathodic reaction zone are electrically isolated from each other by insulator 28 disposed in the wall between said two regions A and B. The cell of FIG. 5 and each of the cells of FIGS. 6, 7 and 8 show a feature of a type of cell which is adapted so as to allow a low charging current or trickle charge to be maintained on first electrode 14 during discharge of the cell. In such a cell baffle means 30 are positioned between regions A and B so as to restrict the flow of current between first and second electrodes 14 and 24 respectively by lengthening the melt path. This modified cell is of significance when first electrode 14 is of a composition which corrodes during discharge. An example of such a material is stainless steel. For instance, stainless steel No. 446 does not corrode appreciably if not used on discharge and if kept in a melt composition between $Na_2S_{4.6}$ and $Na_2S_{5.2}$ plus sulfur. However, during discharge the melt composition can drop to $Na_2S_3$ which will corrode the electrode if it is not charging Thus, to remedy this problem and allow full discharge, a low charging current or trickle charge is maintained on first electrode 14.

In order to still further illustrate the improvement of the invention a specific example is set forth below. However, it should be appreciated that the device design discussed in the Example is merely for illustration and should not be considered limiting in any way.

EXAMPLE

A cell similar to the design of FIG. 1 was built and tested. The discharge electrode consisted of four arms of graphite felt, similar to the design shown in FIG. 3. The charging electrode was of preferred AISI No. 446 stainless steel sheet, 0.025 inch thick. The perforations removed 40% of the sheet area. The sheet was abraded to remove old oxides and used without further treatment. The sheet was formed into a cylinder and fitted about a 0.97 cm O.D. B''-alumina tube. Thus, the charging electrode was similar to the design shown in FIG. 7. The cell container was a pyrex tube 38mm O.D. and 33.5 mm I.D. The B''-alumina tube was 15 cm long; it was joined to a 4 cm long -alumina tube which was joined to a Corning No. 7052 glass tube. Via a graded seal this glass tube was sealed into the pyrex container so that the B'' tube was concentric with the pyrex container. The Corning No. 7052 tube also extended above the pyrex container and was formed into a sodium storage compartment into which a tungsten lead was sealed through the glass. This was the electrode lead for the sodium electrode. An AISI No. 446 lead was welded to the AISI No. 446 electrode, brought out at the top of the cell and sealed to the cell with Epoxy "Torr-Seal" cement. The graphite felt electrode was cemented to a 1 1/32 inches I.D. × 1 3/16 inches O.D. graphite cylinder with "Dylon" graphite cement. A molybdenum wire lead was "Dylon" cemented to the graphite cylinder and brought out of the top of the cell through an expoxy cemented seal. The AISI No. 446 electrode was 3.0 cm high and placed 1.5 cm from the bottom of the cell. The graphite felt electrode was also 3.0 cm high, but the bottom of the graphite electrode was located 3.5 cm above the top of the AISI No. 446 electrode. In this intervening space a thermocouple was placed to determine the melt temperature, as well as a graphite microelectrode probe. By means of resistance measurements, it was possible to determine whether this microelectrode was in a sulfur phase, a polysulfide phase, or an emulsion of both phases.

The assembled cell was lowered into a furnace, heated to 350°C, evacuated to $1.5 \times 10^{-2}$ torr, cooled to 150°C and filled to a level just above the upper graphite felt electrode with 172 grams of a purified grade of sulfur. Prior to use the sulfur was sublimed in the laboratory for purposes of additional purification. The sulfur side of the cell was then sealed by melting shut the glass filler tube. Reagent grade sodium was melted and filtered through pyrex wool into the cell under the $1.5 \times 10^{-2}$ torr vacuum, and the sodium side of the cell was then backfilled from that pressure to 1.5 inches of mercury with argon. The sodium filler arm was melted shut and the cell was brought to 325°C. The graphite electrode was then discharged at 1.0 ampere for 24 hours. A constant voltage of 2.31 volts was set on the AISI No. 446 charging electrode. After four hours from the beginning of discharge, current began to flow abruptly at the charging electrode (averaging 60 milliamps over the remaining 20 hours). After 23 hours of discharge the melt resistance measured at the microprobe electrode changed abruptly from 300,000 ohms to 200 ohms. These observations indicate that complete separation of the sulfur and sulfur-saturated $Na_2S_{5.2}$ phases was taking place, rather than any emulsification of the phases.

Normally a cell of this type would be cycled, i.e., alternately charged and discharged. Thus, the graphite electrode would be discharged while either no current or a trickle charge would flow at the AISI No. 446 electrode, followed by charging at the AISI No. 446 electrode while no current would flow at the graphite electrode. However, in the testing of this cell, in order to simplify the charge/discharge control circuitry and amass the most test hours in a given period of time, both electrodes were operated simultaneously at the same current; namely 1.37 amps (or 150 ma/cm² of B''-alumina area). By operating the cell in this fashion the interface between the two melt phases could be kept at a constant level in the intervening space between the two electrodes. The corrosion resistance of AISI No. 446 stainless steel under conditions of anodic protection (charging) could therefore be evaluated in a known environment; namely $Na_2S_{5.2}$. The cell was run in excess of 2000 hours, after which operation was voluntarily terminated to permit internal examination of the cell. The cell performance is shown in FIG. 9. Lead resistance and B''-alumina resistance has been subtracted. What is shown is the remaining electrode polarization. Interrupter measurements show that this polarization is partly concentration polarization, but mainly ohmic drop at both electrodes. Curve A is the charging voltage at the AISI No. 446 electrode for the first 1700 hours. Line B is the open circuit voltage of the cell. Curve C is the discharge voltage at the graphite electrode. Curve A shows initial improvement in the charging voltage, followed by a gradual drop in performance. At 1700 hours the cell was charged at 1.37 amps for 12 hours with no current flowing at the graphite electrode followed by a corresponding discharge at the graphite electrode with only a trickle charge (0.050 amps) flowing at the AISI No. 446 electrode. As shown by curve A', this one cycle improved the subsequent performance of the stainless steel electrode. Apparently cycling operation degrades performance less than continuous operation at one current density. Curve C shows that the graphite electrode slowly deterioates in its performance under the test conditions.

The conclusions that may be drawn after 2000 hours of operation are:
  a. AISI No. 446 stainless steel can be anodically protected and thereby continue functioning as an effective electrode.
  b. Free convection (sulfur rising polysulfide falling) is very effective in supplying each electrode with its reactant, and keeping both electrodes depolarized; the charging electrode never becomes blocked by a sulfur layer.
  c. The observed polarization of only 0.1 – 0.4 volts is within the charge-discharge efficiency requirements for utility load levelling.

Examination of the cell after the test showed that the AISI No. 446 electrode had corroded slightly, depositing a film of corrosion products on the $B''$-$Al_2O_3$ tube. This may explain the 0.1 – 0.2 volt increase in polarization of this electrode over 2000 hours. Previous results have shown that if the AISI No. 446 electrode has been operated on both charge and discharge the performance would have deteriorated significantly in excess of the 0.1 – 0.2 volts after only 300 hours of operation. Thus the anodic protection is quite effective. In addition, the electrode was prepared with only a minimum thickness of oxide protection. AISI No. 446 stainless steel has been shown to be much more resistant to corrosion by sodium polysulfide when protected by thicker oxide films.

In view of this disclosure, many modifications of the improvement of this invention will be apparent to those skilled in the art. It is intended that all such modifications which fall within the scope of this invention be included within the terms of the appended claims.

I claim:
1. In a secondary battery or cell comprising:
  A. one or more anodic reaction zones containing a molten alkali metal reactant-anode in electrical contact with an external circuit;
  B. one or more cathodic reaction zones containing a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant;
  C. a cation-permeable barrier to mass liquid transfer interposed between and in contact with said anodic and cathodic reaction zones; and
  D. electrode means within said cathodic reaction zone for transporting electrons to the vicinity of said cation-permeable barrier during discharge of said battery or cell and for transporting electrons away from the vicinity of said cation-permeable barrier during charge of said battery or cell, said electrode means being in electrical contact with both said cation-permeable barrier and said external circuit and being immersed, at least in part, in said cathodic reactant, wherein the improvement comprises:

an electrode means which comprises first and second electrodes, said first electrode being (i) adapted to be in use during charge of said battery or cell, (ii) disposed in a first region of said cathodic reaction zone, and (iii) contiguous with or adjacent to first section of said cation permeable barrier, and formed of a conductive material which exhibits a contact angle with said molten polysulfide which is less than the contact angle it exhibits with molten sulfur during operation of said battery or cell, and said second electrode being (i) adapted to be in use during discharge of said battery or cell, (ii) disposed in a second region of said cathodic reaction zone, and (iii) contiguous with or adjacent to a second section of said cation-permeable barrier, and formed of a conductive material which exhibits a contact angle with said molten sulfur which is less than the contact angle it exhibits with said molten polysulfide during operation of said cell.

2. A secondary battery or cell in accordance with claim 1 wherein said second electrode comprises porous conductive material which is disposed within said second region of said cathodic reaction zone such that said region contains a plurality of channels or spaces which are free of said porous conductive material and which in combination with said porous conductive material are adapted to allow flow within said region of said cathodic reactant during operation of said batery or cell.

3. A secondary battery or cell in accordance with claim 1 wherein said first electrode is selected from the group consisting of:
  A. porous conductive material which is disposed within said first region of said cathodic reaction zone such that said region contains a plurality of channels or spaces which are free of said porous conductive material and which, in combination with said porous conductive material, are adapted to allow flow within said region of said cathodic reactant during operation of said battery or cell;
  B. porous conductive material which is confined to an area off said first region of said cathodic reaction zone adjacent to said first section of said cation-permeable barrier; and
  C. two major first electrode portions, the first being porous conductive material which is confined to an area of said first region of said cathodic reaction zone adjacent to said first section of said cation-permeable barrier, and the second portion being a conductive material which is electrically connected to said first portion, but which is spaced from said first portion within said first region so as to create a channel therebetween.

4. A secondary battery or cell in accordance with claim 3 wherein the material from which said first electrode is formed is selected from the group consisting of:
  A. a metal;
  B. materials having a surface consisting of an oxide or sulfur of a metal selected from the group consisting of (i) metals of Groups I, II and III of the Periodic Table of Elements, (ii) Transition Series Metals and (iii) tin, lead, antimony and bismuth;
C. surface oxidized graphite;
D. intercalated graphite;
E. graphite coated with materials of (A), (B), (C) or (D); and
F. combinations or mixtures of (A), (B), (C), (D) or (E).

5. A secondary battery or cell in accordance with claim 1 wherein the device is adapted so as to maintain a continuous low charging current flowing through said first electrode during discharge of said battery or cell.

6. A secondary battery or cell in accordance with claim 1 wherein:
A. said first and second sections of said cation-permeable barrier are interposed and in contact with respectively:
  i. a first anodic reaction zone and said first region of said cathodic reaction zone, and (ii) a second anodic reaction zone and said second region of said cathodic reaction zone so as to electrically isolate said first and second regions; and
B. said first and second anodic reaction zones are adapted so as to allow said alkali metal-anodic reactant to be transferred from said first anodic reaction zone to said second anodic reaction zone.

7. In a secondary battery or cell comprising:
A. one or more anodic reaction zones containing a molten alkali metal reactant-anode in electrical contact with an external circuit;
B. one or more cathodic reaction zone containing (1) a cathodic reactant which, when said battery or cell is at least partially discharged, is selected from the group consisting of (i) a single phase composition comprising molten polysulfide salts of said anodic reactant and (ii) a two phase composition comprising molten sulfur and molten sulfur saturated polysulfide salts of said anodic reactant;
C. a cation-permeable barrier to mass liquid transfer interposed between and in contact with said anodic and cathodic reaction zones; and
D. electrode means within said cathodic reaction zone for transporting electrons to the vicinity of said cation-permeable barrier during discharge of said battery or cell and for transporting electrons away from the vicinity of said cation-permeable barrier during charge of said battery or cell, said electrode means being in electrical contact with both said cation-permeable barrier and said external circuit and being immersed, at least in part, in said cathodic reactant, wherein the improvement comprises:
an electrode means which comprises first and second electrodes, said first electrode being (i) adapted to be in use during charge of said battery or cell, (ii) disposed in a first region of said cathodic reaction zone, (iii) contiguous with or adjacent to a first section of said cation-permeable barrier, and (iv) formed of a conductive material which exhibits a contact angle with said molten polysulfide which is less than the contact angle it exhibits with molten sulfur during operation of said battery or cell, and said second electrode being (i) adapted to be in use during discharge of said battery or cell, (ii) disposed in a second region of said cathodic reaction zone which is positioned above said first region of said cathodic reaction zone, (iii) contiguous with or adjacent to a second section of said cation-permeable barrier and (iv) formed of a conductive material which exhibits a contact angle with said molten sulfur which is less than the contact angle it exhibits with said molten polysulfide during operation of said battery or cell.

8. A secondary battery or cell in accordance with claim 7 wherein said first electrode is selected from the group consisting of:
A porous conductive material which is disposed within said first region of said cathodic reaction zone such that said region contains a plurality of channels or spaces which are (i) free of said porous conductive material and (ii) are adapted to allow flow within said region and from said region to said second region of said cathodic reaction zone of said cathodic reactant during operation of said battery or cell;
B. porous conductive material which is confined to an area of said first region of said cathodic reaction zone adjacent to said first section of said cation-permeable barrier; and
C. two major first electrode portions, the first being porous conductive material which is confined to an area of said first region of said cathodic reaction zone adjacent to said first section of said cation-permeable barrier, and the second portion being a conductive material which is electrically connected to said first portion, but which is spaced from said first portion within said first region so as to create a channel therebetween.

9. A secondary battery or cell in accordance with claim 8 wherein the material from which said first electrode is formed is selected from the group consisting of:
A. a metal;
B. materials having a surface consisting of an oxide or sulfide of a metal selected from the group consisting of (i) metals of Groups I, II and III of the Periodic Table of Elements, (ii) Transition Series Metals and (iii) tin, lead, antimony and bismuth;
C. surface oxidized graphite;
D. intercalated graphite;
E. graphite coated with materials of (A), (B), (C), or (D); and
F. combinations or mixtures of (A), (B), (C), (D) or (E).

10. A secondary battery or cell in accordance with claim 7 wherein:
A. the device is adapted so as to maintain a continuous low charging current flowing through said first electrode during discharge of said battery or cell; and
B. baffle means for restricting the flow of current between said first and second electrodes while applying said low charging current disposed between said first and second regions of said cathodic reaction zone.

11. A secondary battery or cell in accordance with claim 7 wherein:
A. the device is adapted so as to maintain a continuous low charging current flowing through said first electrode during discharge of said battery or cell;
B. said first and second sections of said cation-permeable barrier are interposed and in contact with respectively:
  i. a first anodic reaction zone and said first region of said cathodic reaction zone, and (ii) a second anodic reaction zone and said second region of said cathodic reaction zone so as to electrically isolate said first and second regions; and C. said first and second anodic reaction zones are adapted so as to allow said alkali metal-anodic reactant to be transported from said first anodic reaction zone to said second anodic reaction zone.

12. A secondary battery or cell in accordance with claim 7 wherein said second electrode comprises porous conductive. material which is disposed within said second region of said cathodic reaction zone such that said region contains a plurality of vertical channels or spaces which (i) are free of said porous conductive material (ii) extend from the bottom of said region upward and at least partially through said region and (iii) are adapted to promote flow of cathodic reactant within said second region as well as to and from said first region of said cathodic reaction zone during operation of said battery or cell.

13. A secondary battery or cell in accordance with claim 12 wherein said first electrode is selected from the group consisting of:
A. porous conductive material which is disposed within said first region of said cathodic reaction zone such that said region contains a plurality of channels or spaces which (i) are free of said porous conductive material and (ii) are adapted to allow flow within said region and from said region to said second region of said cathodic reaction zone of said cathodic reactant during operation of said battery or cell;
B. porous conductive material which is confined to an area of said first region of said cathodic reaction zone adjacent to said first section of said cation-permeable barrier; and
C. two major first electrode portions, the first being porous conductive material which is confined to an area of said first region of said cathodic reaction zone adjacent to said first section of said cation-permeable barrier, and the second portion being a conductive material which is electrically connected to said first portion, but which is spaced from said first portion within said first region so as to create a channel therebetween.

14. A secondary battery or cell in accordance with claim 12 wherein:
A. the device is adapted to maintain a continuous low charging current flowing through said first electrode during discharge of said battery or cell; and
B. baffle means for restricting the flow of current between said first and second electrodes while applying said low charging current disposed between said first and second regions of said cathodic reaction zone.

15. A secondary battery or cell in accordance with claim 12 wherein:
A. the device is adapted so as to maintain a continuous low charging current flowing through said first electrode during discharge of said battery or cell;
B. said first and second sections of said cation-permeable barrier are interposed and in contact with respectively:
  i. a first anodic reaction zone and said first region of said cathodic reaction zone, and (ii) a seonc anodic reaction zone and said second region of said cathodic reaction zone so as to electrically isolate said first and second regions; and
C. said first and second anodic reaction zones are adapted so as to allow said alkali metal-anodic reactant to be transferred from said first anodic reaction zone to said second anodic reaction zone.

16. In a secondary battery or cell comprising:
A. a container;
B. a cation-permeable barrier to mass liquid transfer which is disposed within said container so as to create an anodic reaction zone within said barrier and a cathodic reaction zone between said barrier and said container;
C. a molten alkali metal anodic reactant within said anodic reaction zone in electrical contact with an external circuit;
D. a cathodic reactant comprising a liquid electrolyte which is electrochemically reversibly reactive with said anodic reactant and which, when said cell or battery is in at least a partially discharged state, is selected from the group consisting of (a) a single phase composition comprising molten polysulfide salts of said anodic reactant and (b) a two phase composition comprising molten sulfur and molten sulfur saturated polysulfide salts of said anodic reactant; and
E. electrode means within said cathodic reaction zone for transporting electrons to the vicinity of said cation-permeable barrier discharge of said battery or cell and for transporting electrons away from the vicinity of said cation-permeable barrier during charge of said battery or cell, said electrode means being in electrical contact with both said cation-permeable barrier and said external circuit and being immersed, at least in part, in said cathodic reactant, wherein the improvement comprises:

an electrode means which comprises first and second electrodes, said first electrode being (i) adapted to be in use during charge of said battery or cell, (ii) disposed in a first region of said cathodic reaction zone, (iii) contiguous with or adjacent to a first section of said cation-permeable barrier, and (iv) formed of a conductive material which exhibits a contact angle with said molten polysulfide which is less than the contact angle it exhibits with molten sulfur during operation of said battery or cell and said second electrode being (i) adapted to be in use during discharge of said battery or cell, (ii) disposed in a second region of said cathodic reaction zone which is positioned above said first region of said cathodic reaction zone, (iii) contiguous, at least in part, with a second section of said cation-permeable barrier and (iv) formed of a porous conductive material which exhibits a contact angle with said molten sulfur which is less than the contact angle it exhibits with said molten polysulfide during operation of said battery or cell and which is disposed within said second region of said cathodic reaction zone such that said region contains a plurality of vertical channels or spaces which
  a. are free of said porous conductive material,
  b. extend from the bottom of said region upward and at least partially through said region, and
  c. are adapted to promote flow of cathodic reactant within said second region as well as to and from said first region of said cathodic reaction zone during operation of said battery or cell.

17. A secondary battery or cell in accordance with claim 16 wherein said cation-permeable barrier and said container are tubular.

18. A secondary battery or cell in accordance with claim 16 wherein said first electrode is selected from the group consisting of:
   A. porous conductive material which is disposed within said first region of said cathodic reaction zone such that said region contains a plurality of channels or spaces which (i) are free of said porous conductive material and (ii) are adapted to allow flow within said region and from said region to said second region of said cathodic reaction zone of said cathodic reactant during operation of said battery or cell;
   B. porous conductive material which is confined to an area of said first region of said cathodic reaction zone adjacent to said first section of said cation-permeable barrier; and
   C. two major first electrode portions, the first being porous conductive material which is confined to an area of said first region of said cathodic reaction zone adjacent to said first section of said cation-permeable barrier, and the second portion being a conductive material which is electrically connected to said first portion, but which is spaced from said first portion within said first region so as to create a channel therebetween.

19. A secondary battery or cell in accordance with claim 18 wherein said first electrode is a perforated metal sheet which is contiguous with and wrapped around said first section of said cation-permeable barrier.

20. A secondary battery or cell in accordance with claim 19 wherein said cation permeable barrier is tubular and said perforated metal sheet is stainless steel.

21. A secondary battery or cell in accordance with claim 18 wherein said porous conductive material is a felt which is contiguous with and wrapped around said cation-permeable barrier.

22. A secondary battery or cell in accordance with claim 16 wherein said first electrode comprises two major portions, the first being a perforated metal sheet which is contiguous with and wrapped around said frist section of said cation-permeable barrier, and the second being a metal cylinder surrounding said first portion and which is electrically connected with said first portion.

23. A secondary battery or cell in accordance with claim 16 wherein said second electrode is selected from the group consisting of graphite felt, graphite foam, porous graphite, vitreous carbon foaming pyrolytic graphite felt, pyrolytic graphite foam, and materials covered with the same.

24. A secondary battery or cell in accordance with claim 16 wherein said second electrode comprises a first portion which is contiguous with and wrapped around said second section of said cation-permeable barrier and a plurality of other portions which extend outwardly from said cation-permeable barrier to the walls of said container.

* * * * *